(12) United States Patent
Pawlak

(10) Patent No.: US 8,641,355 B2
(45) Date of Patent: Feb. 4, 2014

(54) TRUCK CAP REMOVER AND INSTALLER

(76) Inventor: Gary Pawlak, Irondequoit, NY (US)

( * ) Notice: Subject to any disclaimer, the term of this patent is extended or adjusted under 35 U.S.C. 154(b) by 183 days.

(21) Appl. No.: 13/304,655

(22) Filed: Nov. 27, 2011

(65) Prior Publication Data

US 2012/0155997 A1 Jun. 21, 2012

Related U.S. Application Data

(60) Provisional application No. 61/423,130, filed on Dec. 15, 2010.

(51) Int. Cl.
| | |
|---|---|
| *B66C 23/44* | (2006.01) |
| *B60P 9/00* | (2006.01) |
| *B60R 11/00* | (2006.01) |
| *B66C 23/20* | (2006.01) |
| *B66C 23/00* | (2006.01) |

(52) U.S. Cl.
USPC .............. 414/462; 414/543; 212/180; 254/47

(58) Field of Classification Search
USPC ......... 14/72.5; 212/180, 258; 248/188.5, 351, 248/354.1; 254/127, 133 R, 2 C, 2 R, 47, 254/DIG. 16; 414/10, 11, 12, 373, 462, 495, 414/543, 589; 5/87.1; 52/118, 126.6
See application file for complete search history.

(56) References Cited

U.S. PATENT DOCUMENTS

| | | | | | |
|---|---|---|---|---|---|
| 3,669,281 | A | * | 6/1972 | Woodside et al. | 212/238 |
| 3,841,603 | A | * | 10/1974 | Lund et al. | 254/4 R |
| 4,419,038 | A | * | 12/1983 | Pendergraft | 414/543 |
| 4,810,158 | A | | 3/1989 | Bitzer | |
| 4,899,985 | A | * | 2/1990 | Good | 254/8 B |
| 4,927,206 | A | | 5/1990 | Murdock | |
| 5,984,275 | A | * | 11/1999 | Hoslett | 254/338 |
| 5,993,137 | A | | 11/1999 | Harr | |
| 6,017,018 | A | * | 1/2000 | Langdon | 254/47 |
| 6,120,236 | A | * | 9/2000 | Smith | 414/589 |
| 6,152,427 | A | | 11/2000 | Hoslett | |
| 7,080,823 | B1 | * | 7/2006 | Triplett | 254/8 B |
| 7,568,678 | B2 | * | 8/2009 | Hammond | 254/338 |
| 2009/0309079 | A1 | * | 12/2009 | Lacina | 254/47 |

* cited by examiner

*Primary Examiner* — Gregory Adams
(74) *Attorney, Agent, or Firm* — Tracy Jong Law Firm; Tracy P. Jong; Cheng Ning Jong

(57) ABSTRACT

An apparatus for removing and installing a truck cap, the apparatus is formed by a box member having an opening, the box member being adapted at one end to a truck hitch and the other to a sleeve. A mast is rotatably disposed in the sleeve. A boom having a first end and a second end is fixedly attached at a right angle at the first end to the mast. A first slideable member is slideably coupled to the boom at the second end of the boom. A spread arm is fixedly attached at a right angle to the first slideable member. At least two bumpers are disposed on the spread arm and one bumper on the boom. In use, the rod of a jack disposed within the box member engages the mast through the opening of the box member to raise or lower the mast.

19 Claims, 7 Drawing Sheets

TRUCK CAP REMOVER AND INSTALLER

RELATED APPLICATIONS AND PRIORITY CLAIM

This application claims priority to provisional application U.S. Ser. No. 61/423,130 filed Dec. 15, 2010. Said application is incorporated by reference herein in its entirety.

BACKGROUND OF THE INVENTION

1. The Field of the Invention

The present invention is directed generally to a lifting device, and more particularly, to a lifting device adapted to remove and install a truck cap or canopy.

2. Background Art

Pickup trucks with open beds have become popular as a means for transporting goods and/or personnel. Various types of removable truck caps have been made available and configured to be used to cover open beds in order to protect the goods placed on the open beds from weather elements and theft. In some instances, truck caps are also used as temporary shelters for camping, outdoor barbecues and the like. While truck caps provide protection for goods when installed on truck beds, it is often desirable to remove it for easy loading and unloading of materials or goods on the truck beds.

A truck cap is typically configured to be easily attachable and detachable to the sidewalls of a truck bed. Reference is made to U.S. Pat. No. 4,927,206 to Murdock for an exemplary truck cap that is easily attachable and detachable to a truck bed. Typical truck caps are relatively bulky and awkward to handle, weighing up to 300 lbs. The size and weight present a significant problem for removal and installation, especially by one person working alone. Typically, a group of at least two people is required to remove a truck cap with each lifting one side of the truck cap and moving it towards the back of the truck and positioning it on a floor or a support. In order to further share the weight load, a group of four people is preferable to lift and remove a truck cap, with each person handling or lifting each corner of the truck cap in concert with others in the group.

U.S. Pat. No. 6,152,427 to Hoslett discloses a truck cap hoisting system comprising a winch, at least one pulley, at least two support channels, at least two lifting strap assemblies, and a lifting line. The truck cap lifting system is preferably installed in a garage. The winch and a guide pulley are attached to a wall of the garage. The lift pulley is attached to a ceiling or an overhead beam. The lifting line is fastened to a lift ring and a reel of the winch. Each lifting strap assembly is threaded through one end of the at least two support channels. The truck cap is hoisted off the pick-up truck by first placing spacers between the truck box and the truck cap and sliding support channels in the gap. The same procedure is repeated for the opposite side. Four S-hooks extending from the at least two lifting assemblies are attached to the lift ring. The winch is then rotated until the truck cap is hoisted to a suitable height. Although this system can be used to perform the same tasks as the present invention, i.e., facilitating the removal and installation of a truck cap, this disclosure reveals a removal system that requires a raised structure that is not supported or otherwise attached to the truck for supporting a detached truck cap. This structure further requires multiple steps in maneuvering of the lifting strap assembly in order to secure S-hooks to the truck cap prior to lifting the cap. In addition, the truck would need to be centrally parked under the lifting strap assembly such that the lifted truck cap could be properly centered.

U.S. Pat. No. 5,993,137A to Harr discloses a hoist for raising and lowering objects that may be attached to a vehicle. The hoist includes a support column and a boom attached thereto. The boom can be raised and lowered by a hydraulic double action cylinder. Both the support column and cylinder are attached to a bracket. The bracket is in turn being rotatably connected to a base unit so that the boom can be rotated as well as raised and lowered. The support column and boom can be adjusted with respect to one another and to the bracket, to balance loads and to adjust the reach of the hoist. The base unit includes outriggers to support and stabilize the hoist, preferably three outriggers in a triangular configuration. Adjustments to the hoists can be made by inserting and removing penetrating pins through adjustment holes in the hoist members. This structure is mountable to a vehicle hitch and includes outriggers and additional hardware to effect rotation of the hoist. The boom is rotatable and the effective length of the boom is adjustable. This disclosure lacks the teachings of a structure or surface for supporting, lifting or positioning a truck cap nor is it easy and quick to set up such a device due to the extraneous outriggers and the rather complex mechanism for rotating the hoist.

U.S. Pat. No. 4,810,158 to Bitzer discloses a kit for enabling one person to remove a truck cap from over a truck bed. The cap is provided with hold down bolt holes. The kit includes detachable forward rollers for attaching to and detaching from a forward portion of the truck cap, and for rollably engaging the truck bed and maintaining the truck cap in rolling engagement with the truck bed when the detachably forward rollers are attached to the truck cap and when the truck cap is disposed over the truck bed. The kit also includes detachable rear wheels for attaching to and detaching from a rear portion of the truck cap and for providing the truck cap with rolling mobility upon removal of the truck cap from the truck bed. This disclosure teaches a maneuver which still requires some amount of manual lifting of the truck cap and is time consuming since a user has to attach and detach a roller or wheel at each corner of the truck cap.

Thus, there exists a need for an apparatus which is easy to install and use that is compact in size, low cost and simple to manufacture.

SUMMARY OF THE INVENTION

The present apparatus discloses an apparatus for removing and installing a truck cap, the apparatus is adapted to be rotatably mountable to a hitch of a truck which is equipped with a truck cap. The apparatus is used to lift a truck cap that has been unlocked from the truck, rotate it about 180 degrees so that the truck cap clears the truck bed entirely and lowers the truck cap onto a support positioned adjacent the truck bed. The apparatus comprises a box member having a hitch end, a mast end, an opening, a stop and a cavity for receiving a jack. The box member is configured to be adapted to a hitch at the hitch end and the opening is disposed at the mast end and the stop is disposed about the periphery of the opening. The apparatus further comprises a sleeve having a lower end, an upper end and a cavity. The lower end is securely attached to the mast end of the box member such that the sleeve is coaxially aligned with the opening.

The apparatus further comprises a mast having a lower end and an upper end, wherein the lower end of the mast comes in contacting engagement with an actuator such that when the actuator is extended through the opening, the mast is raised and when the actuator is retracted from the opening, the lower end of the mast rests on the stop. The mast is configured to be rotatable about the central axis of the sleeve and slideable within the cavity of the sleeve. In one embodiment, the actuator comprises a jack having a head and a rod, wherein the jack is disposed in the cavity of the box member such that the rod is configured to be extendable through the opening of the base member. The apparatus further comprises a boom having a first end, a second end and a cavity. The first end is removably connected at substantially right angle to the upper end of the mast. A first slideable member having a free end and a slideable end is configured to be slideably attached at the slideable end within the cavity of the boom and securable to the boom. There is further provided a means for supporting a ceiling of a truck cap, wherein the means is cooperatively supported by the first slideable member and the boom. In one embodiment, the means for supporting the ceiling of the truck cap comprises an elongated spread arm disposed at substantially right angle at the free end of the first slideable member and at least three upwardly facing bumpers, each disposed at each end of the spread arm and on the boom such that the three upwardly facing bumpers are substantially coplanarly disposed. In one embodiment, each of the upwardly facing bumpers is further adapted to a second slideable member configured to slide substantially parallelly to the boom.

It is a primary object of the present invention to provide a truck cap remover and installer that can be independently supported by a truck and does not require a structure extraneous to the truck.

It is also a primary object of the present invention to provide a truck cap remover and installer that can be operated by one person.

It is another object of the present invention to provide a truck cap remover and installer that utilizes a commonly available conventional jack.

It is another object of the present invention to provide a truck cap remover and installer that is relatively compact and collapsible.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of the claims appended to this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

1—truck cab
2—truck cap remover and installer
3—truck
4—hitch
5—cavity
6—truck bed
7—floor
8—truck cap
9—opening
10—rear door
11—hitch socket
12—bumper
13—cavity of sleeve
14—support
16—hitch adaptor
18—box member
20—mast
21—sleeve
22—reinforcement fillet
23—ceiling of truck cap
24—boom
26—cutout in mast for receiving boom
27—stop
28—connection point between turnbuckle and boom
30—connection point between turnbuckle and mast
32—turnbuckle
34—first slideable member
36—spread arm
38—bumper height adjuster
39—second slideable member
40—jack
42—jack handle receiver
44—jack rod
46—jack head
48—locking pin 50—aperture
52—lower end of sleeve
54—upper end of sleeve
56—slot
58—roller
60—central axis of sleeve

PARTICULAR ADVANTAGES OF THE INVENTION

The present invention provides a truck cap remover and installer (apparatus) that is operable by one person. The apparatus is simple to manufacture, install and collapse. The apparatus is mountable to a truck on which it is used, thus eliminating the need for a separate support, thereby rendering the present apparatus self contained. The apparatus can be used without a cooperating structure which is often available in a static form. It is configured to be mounted to a truck hitch which is a commonplace for a truck. The apparatus is further configured for use with a conventional and ubiquitous jack, thereby eliminating the need for a dedicated jack which requires proper maintenance and storage. Materials cost is further saved by configuring the apparatus for use with a conventional jack, thereby eliminating the need for acquiring a dedicated jack.

DETAILED DESCRIPTION OF A PREFERRED EMBODIMENT

The present invention discloses an apparatus for removing and installing a truck cap that is adapted to be rotatably mountable to a hitch of a truck that is equipped with a truck cap. The apparatus is used to lift a truck cap that has been unlocked from the truck, rotate it about 180 degrees so that the truck cap clears the truck bed entirely and lowers the truck cap onto a support positioned adjacent the rear of the truck from which the truck cap was removed. The apparatus is configured to be mountable to a trailer hitch and operable by a single person. The term "truck cap remover and installer" is used interchangeably in this disclosure with "truck cap remover" or "apparatus" to mean the device according to the present invention that is attached to a hitch of a truck and used to remove a truck cap that has been positioned on a truck bed or to install a truck cap on the truck bed. The term "substantially right angle" as used herein is defined as 3 degrees above or below 90 degrees.

Figure 1:
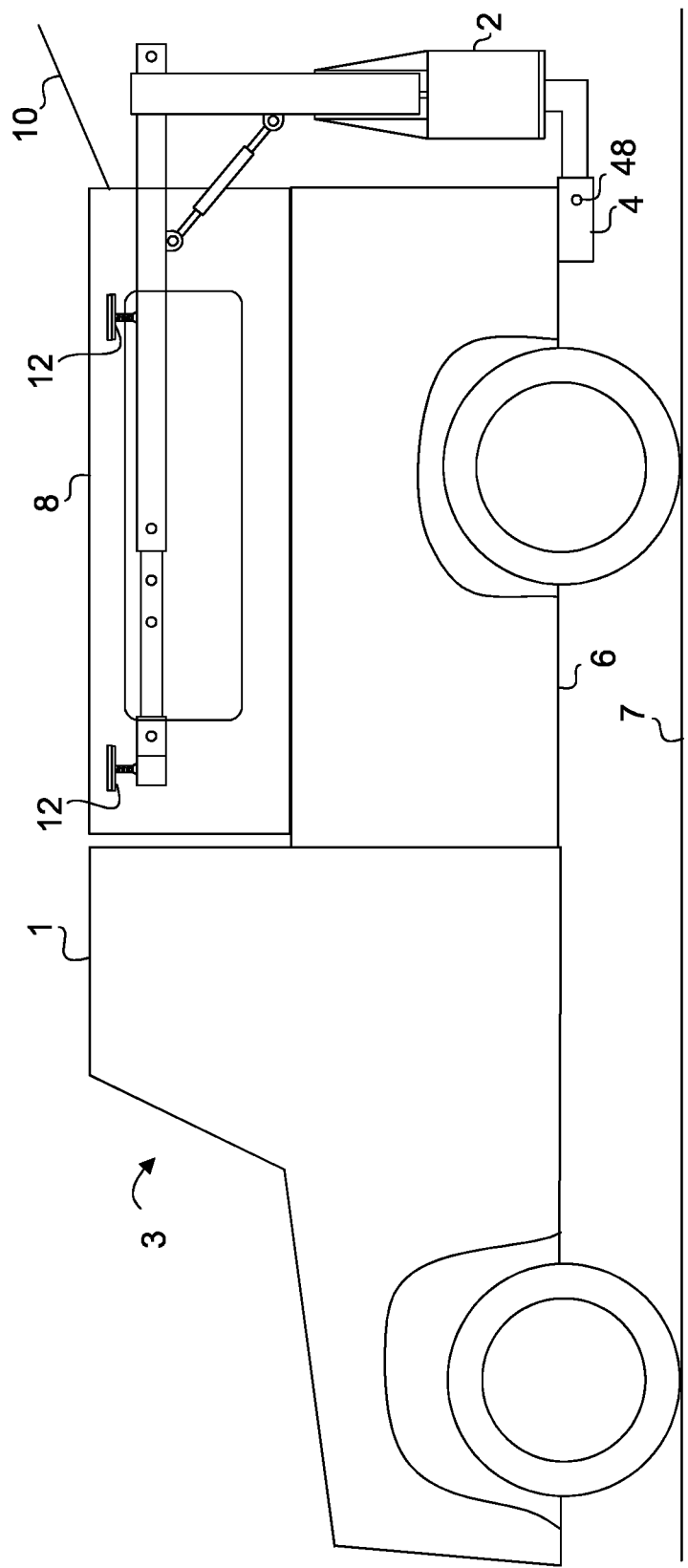
FIG. 1 is a side partially transparent orthogonal view of a truck bed depicting a truck, a truck bed and a truck cap remover and installer according to the present invention.

FIG. 1 is a side partially transparent orthogonal view of a truck bed 6, depicting a truck 3, a truck bed 6 and a truck cap remover and installer (apparatus) 2 according to the present invention. The apparatus 2 is attached to a hitch 4 and locked in place with a locking pin 48. The apparatus 2 is in turn attached to the tail end of the truck bed 6. A truck cap 8 is shown positioned over the truck bed 6 with a rear door 10 pivotably opened to make way for disposing the apparatus 2 within the cavity defined by the truck cap 8. The truck 3 is preferably parked on a level floor 7 such that when the truck cap 8 is lifted, the truck cap 8 does not have the tendency to slide off the bumpers 12.

Figure 2:
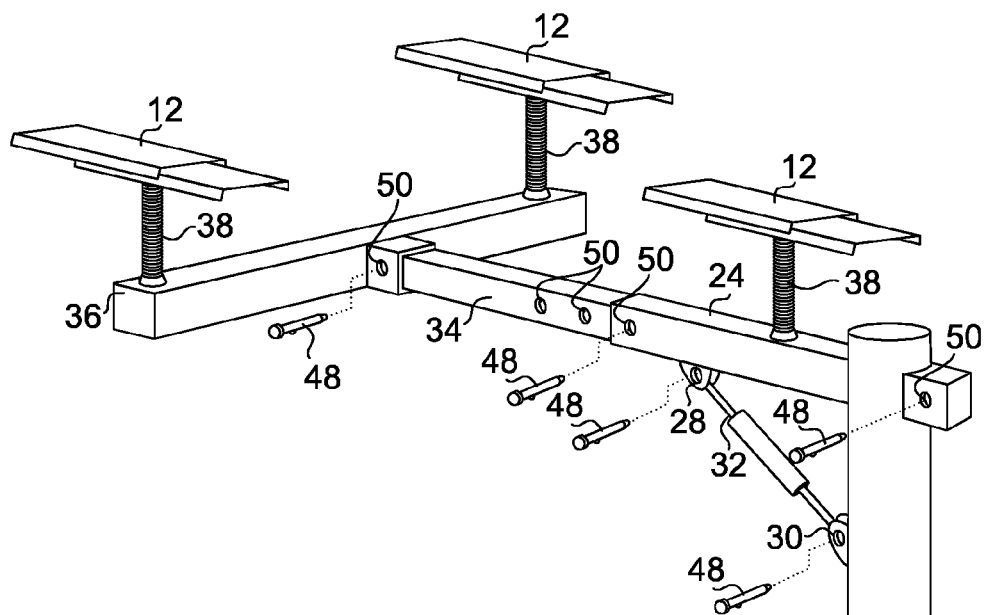
FIG. 2 is a rear top perspective view of a truck cap remover and installer.
Figure 2:
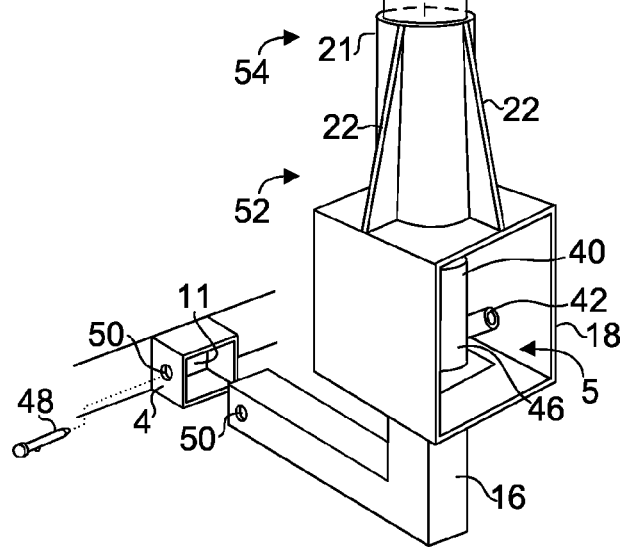
Figure 3:
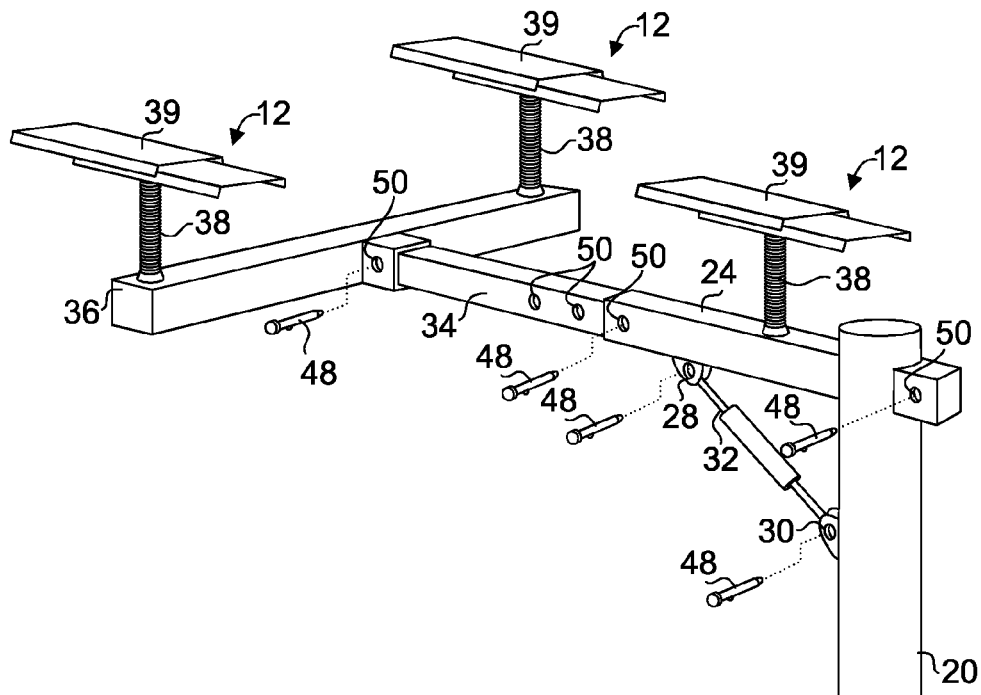
FIG. 3 is a rear top partially transparent perspective view of a truck cap remover and installer, depicting the interface between a mast and an actuator used to raise or lower it.

FIG. 2 is a rear top perspective view of a truck cap remover and installer according to the present invention. FIG. 3 is a rear top partially transparent perspective view of a truck cap remover and installer depicting the interface between a mast and an actuator used to raise or lower it. Referring to both FIGS. 2 and 3, the present apparatus comprises a box member 18 having a hitch end, a mast end, an opening 9, a stop 27 and a cavity 5 for receiving a jack 40. The box member 18 is configured to be adapted to a hitch 4 at the hitch end. The opening 9 is disposed at the mast end and the stop 27 is disposed about a periphery of the opening 9. Each of the mast and hitch ends is a rectangular plate. These rectangular plates are connected on two sides by two opposing lateral walls and on the front by a front wall 19, leaving the rear open to enable positioning of a jack within the cavity 5.

In one embodiment, the hitch end is fixedly attached to one end of a hitch adaptor 16 shaped in a right angle configuration. The opposing end of the hitch adaptor 16 is configured in the shape and size of the hitch socket 11 such that it can be snugly secured in the hitch socket 11. The hitch adaptor 16 is further secured by placing a locking pin 48 through the aperture 50 of the hitch socket and aperture 50 of the hitch adaptor 16.

Although the present apparatus is best suited to receive a conventional upright hydraulic jack or bottle jack, any suitable type or style of jack may be used provided that the rod of a jack is capable to being disposed within the opening 9 for lifting or lowering the mast. According to the preferred embodiment of the present invention, the bottle jack 40 is commercially available, such as the AC-Delco® Hydraulic Bottle Jack, Model 34112.

The apparatus further includes a cylindrical sleeve 21 having a lower end 52, an upper end 54 and a cavity, wherein the lower end is securely attached to the mast end of the box member 18 such that the sleeve is coaxially aligned with the opening. The sleeve 21 is further secured to the box member 18 by welding the sleeve 21 and the box member 18 to a plurality of fillets 22 about the periphery of the sleeve 21. There is further provided a mast 20 having a lower end and an upper end, wherein the lower end of the mast 20 is configured to come in contacting engagement with the rod 44 of the jack 40 such that when the jack 40 is extended through the opening 9, the mast 20 is raised and when the jack 40 is retracted from the opening 9, the lower end of the mast 20 rests on the stop 27.

The mast 20 is essentially a cylinder configured close in diameter but slightly smaller than the sleeve cavity 13 such that the mast 20 is rotatable about the central axis 60 of the sleeve and slideable within the sleeve cavity 13. There is further provided a boom 24 having a first end, a second end and a cavity disposed on the second end, wherein the first end is removably connected at substantially right angle to the upper end of the mast 20. The boom is preferably constructed from a rectangular tubing material. The upper end of the mast 20 is preferably constructed with a rectangular cutout 26 for receiving the first end of the rectangularly shaped boom 24.

The boom 24 is secured to the mast 20 using a turnbuckle having one end attached to the boom 24 at connection point 28 and the other to the mast 20 at connection point 30. In use, the turnbuckle 32 is rotated until the boom 24 is substantially rigidly attached to the mast 20. Although the mast and the boom may be constructed as a unit, the present construction allows the mast 20 and the boom 24 to be separable for storage or transport. Such configuration also allows the boom 24 to be disposed at a concave or convex angle with respect to the mast 20, further providing adjustability of the boom 24 with respect to truck cap 8. In order to further secure the boom 24 to the mast 20, a locking pin 48 is inserted into an aperture 50 disposed on the first end of the boom 24 to prevent the boom 24 from sliding off the cutout 26 that receives it.

There is further provided a first slideable member 34 having a free end and a slideable end that is configured to be slideably attached at the slideable end within the cavity of the boom 24. When disposed in the cavity, the slideable end is disposed substantially parallelly to the boom 24 and securable to the boom 24 with a locking pin 48. In one embodiment, a plurality of apertures 50 are disposed on at least one surface of the boom 24 and on one matching surface of the first slideable member 34 such that the first slideable member 34 may be locked in place to the boom 24 by inserting a locking pin 48 through aligned apertures of the boom 24 and the first slideable member 34.

There is further provided a means for supporting a ceiling of the truck cap 8. In one embodiment, the means for supporting the ceiling of the truck cap 8 is a plurality of upwardly facing bumpers 12, two of which are mounted on each end of a spread arm 36. The third is mounted on the boom 24. In use, a truck cap 8 is cooperatively supported by the plurality of upwardly facing bumpers 12. The mounting of bumpers 12 on two structures having a slideable relationship enables the stance defined by the bumpers 12 to be adjustable. For instance, an extended first slideable member 34 creates a wider stance than a retracted first slideable member 34, thereby enabling the apparatus to more ably support a larger truck cap.

In one embodiment, each bumper 12 is further mounted on a screw-nut type height adjuster 38 such that the height of each bumper 12 can be fine tuned. In use with a planar truck cap ceiling, the bumper height adjusters 38 are adjusted such that the bumpers are substantially coplanarly disposed. However, the bumpers may be suitably adjusted to lift a truck cap ceiling having a non-planar profile such that the truck cap can be raised in a level manner to avoid tipping. Each bumper is constructed from a rubber, rubber-like or otherwise soft material that provides non-abrasive support to a truck cap.

In one embodiment, each bumper 12 is further adapted to a second slideable member 39 configured to slide substantially parallelly to the boom 24. An exemplary second slideable member is a drawer-style slide. In one embodiment not shown, a second slideable member is not required since the bumpers 12 are constructed from a polymeric material having a low surface friction factor such as teflon, nylon and the like. In such case, upon lifting a truck cap for removal, the truck cap 8 is simply pulled and slides on top of the bumpers 12 for a distance of a few inches such that the front end of the truck cap 8 clears the truck cab 1 for subsequent rotation of the truck cap 8. A novel procedure for removing a truck cap 8 is disclosed elsewhere in this document. In another embodiment not shown, each second slideable member includes one or more wheels which further facilitate the process of pulling the truck cap 8 to clear the truck cab 1.

Figure 3A:
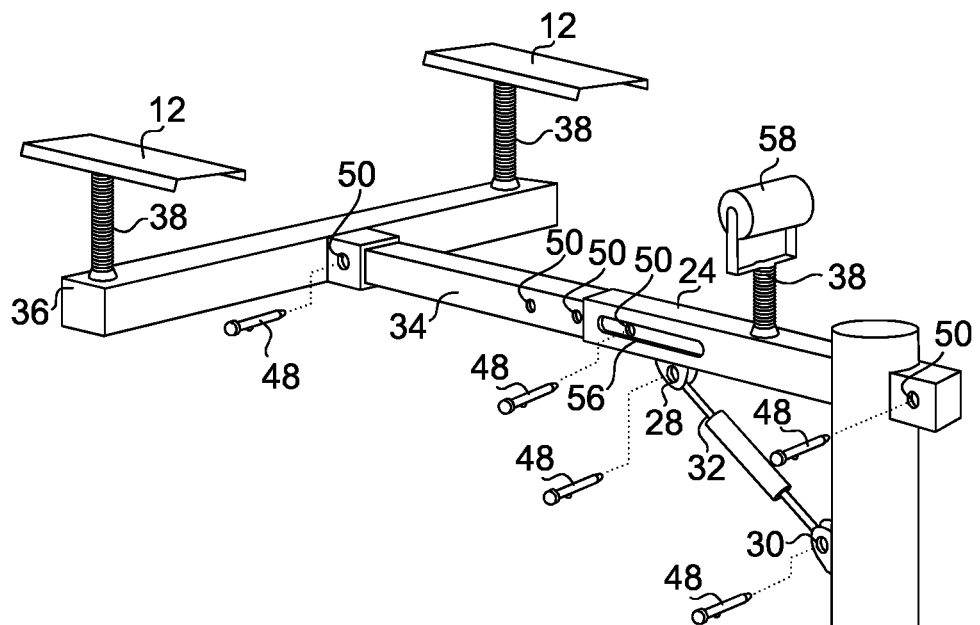
FIG. 3A is a rear top perspective view of another embodiment according to the present invention.

FIG. 3A is a rear top perspective view of another embodiment according to the present invention depicting a mechanism for facilitating slideable movement between a truck cap 8 and the present apparatus 2. In this embodiment, an elongated slot 56 is disposed in close proximity to a free end of the boom 24 and in substantial lengthwise alignment with the boom 24. A locking pin 48 is again inserted in an aperture 50 disposed on the first slideable member 34 to prevent the first slideable member 34 from detaching from the boom 24 and serve as a travel limit of the first slideable member 34. In this embodiment, two bumpers 12, preferably constructed from a rubber or polymeric material, are disposed on the ends of the spread arm 36. As slideable movement is provided by the first slideable member 34, a second slideable member is not required. There is provided a roller 58 mounted to the boom 24 such that its rolling action is aligned with the lengthwise direction of the boom 24. The bumpers 12 and the roller 58 cooperate to provide a stable stance in addition to slideable relationship between the present apparatus and a truck cap.

Figure 4:
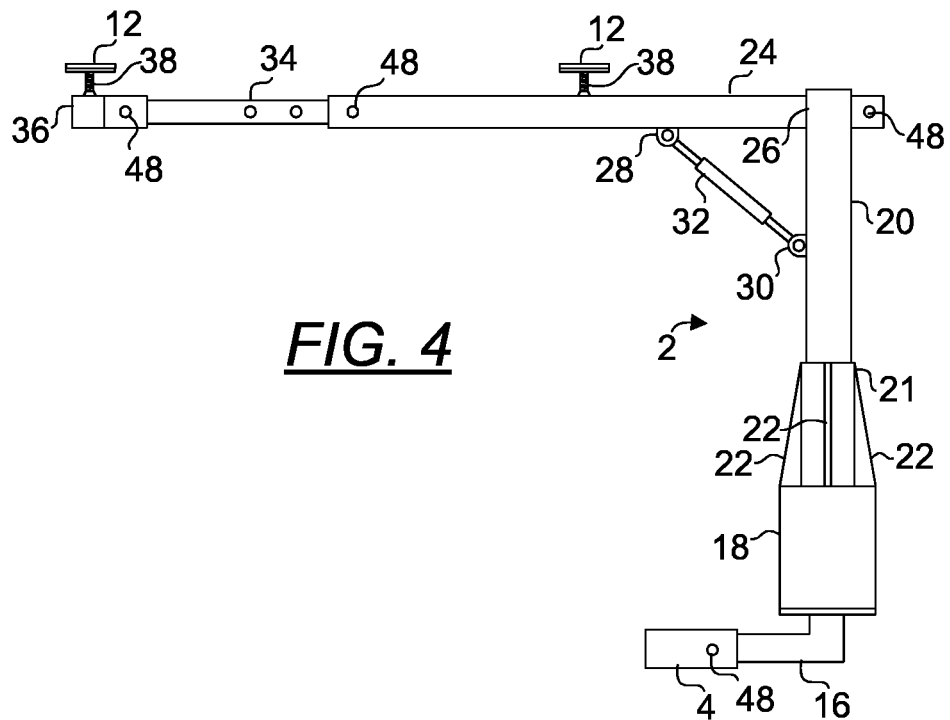
FIG. 4 is a side orthogonal view of a truck cap remover and installer.
Figure 5:
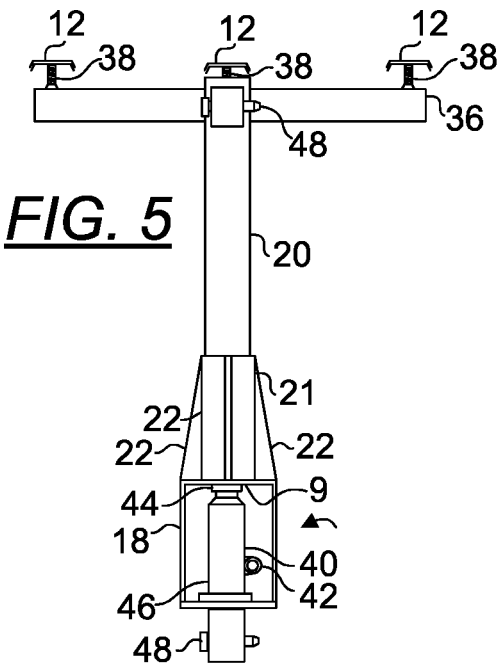
FIG. 5 is a rear orthogonal view of a truck cap remover and installer.
Figure 6:
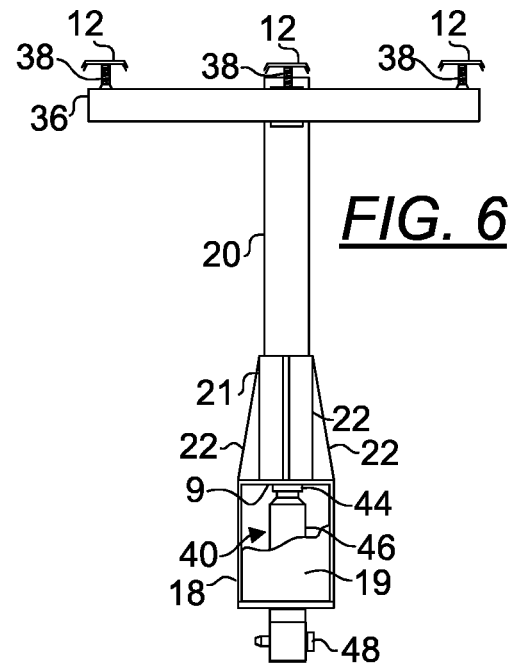
FIG. 6 is a front orthogonal view of a truck cap remover and installer.

FIGS. 4, 5 and 6 are side, rear and front orthogonal views, respectively, of a truck cap remover and installer 2. FIG. 5 clearly depicts a manually operated hydraulic jack 40 including a jack rod 44, a jack head 46 and a jack handle receiver 42. The jack 40 is simply supported within the cavity 5 of the box member 18 with the jack rod 44 positioned at the mast end of the box member 18. In use, a rod configured to be inserted into the jack handle receiver 42 is inserted at one end into the jack handle receiver 42. The jack is then cranked until the jack rod 44 engages the lower end of the mast 20 through the opening 9. In FIG. 6, the upper portion of the front wall 19 is removed to reveal the jack 40 disposed within the cavity 5.

Figure 7:
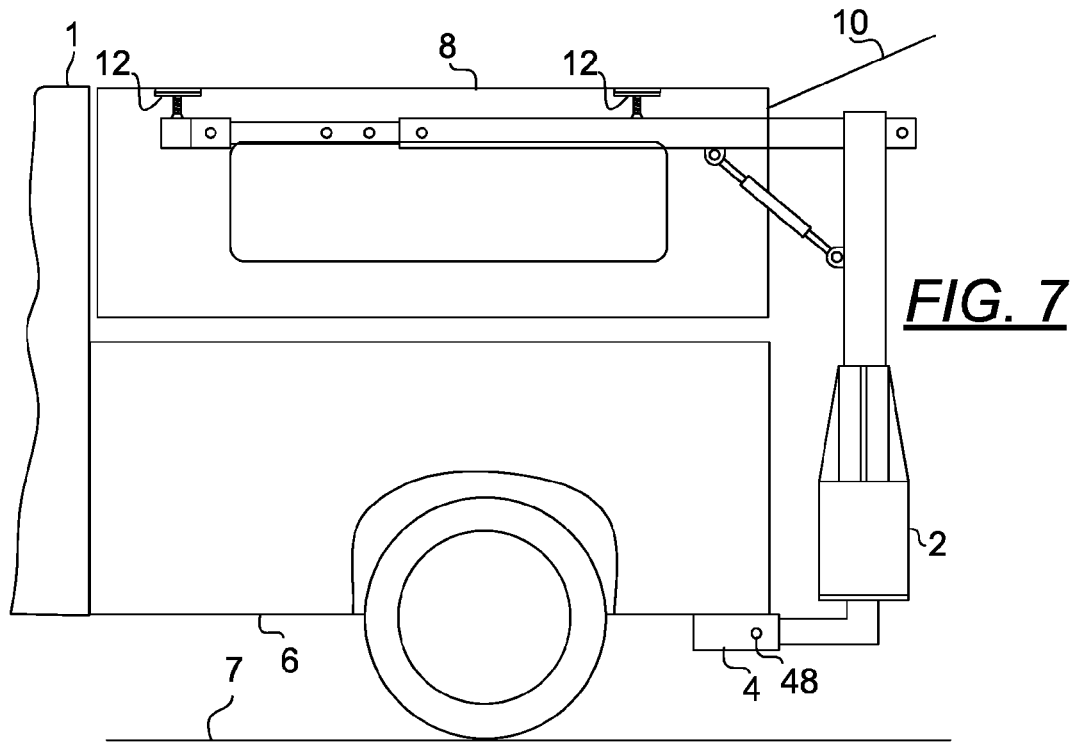
FIG. 7 is a side partially transparent orthogonal view of a truck bed depicting the truck cap remover and installer of FIG. 1 upon raising the truck cap.
Figure 8:
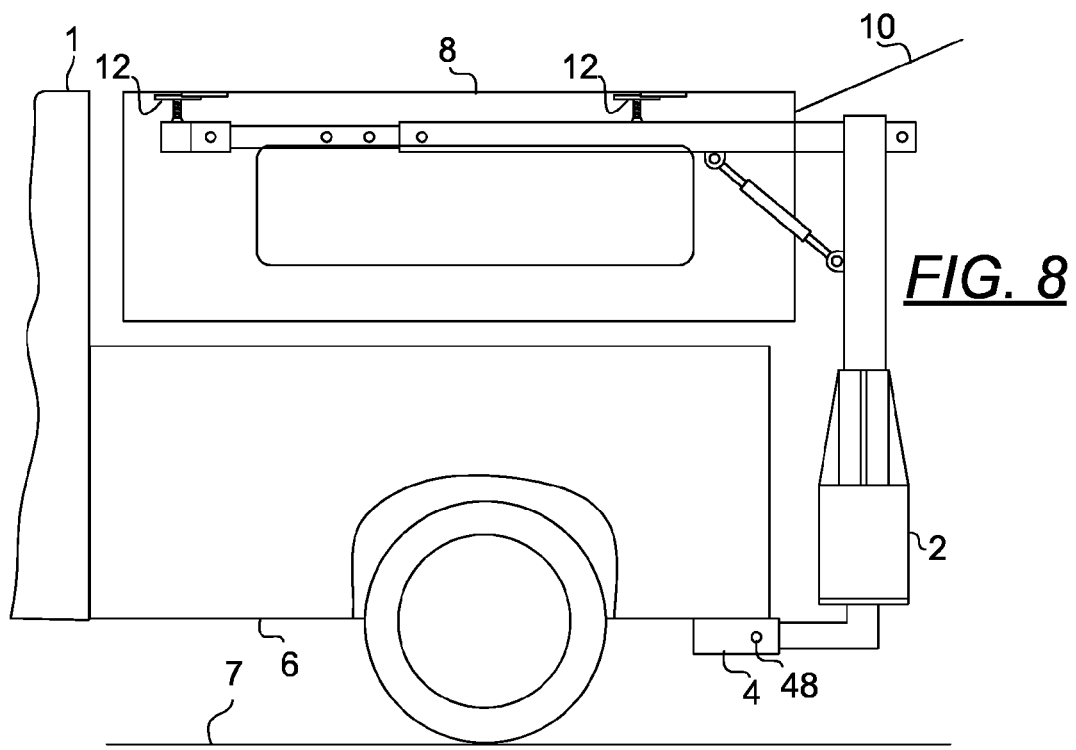
FIG. 8 is a side partially transparent orthogonal view of a truck bed depicting a truck cap remover and installer of FIG. 7 upon sliding back the truck cap that has been raised.
Figure 9:
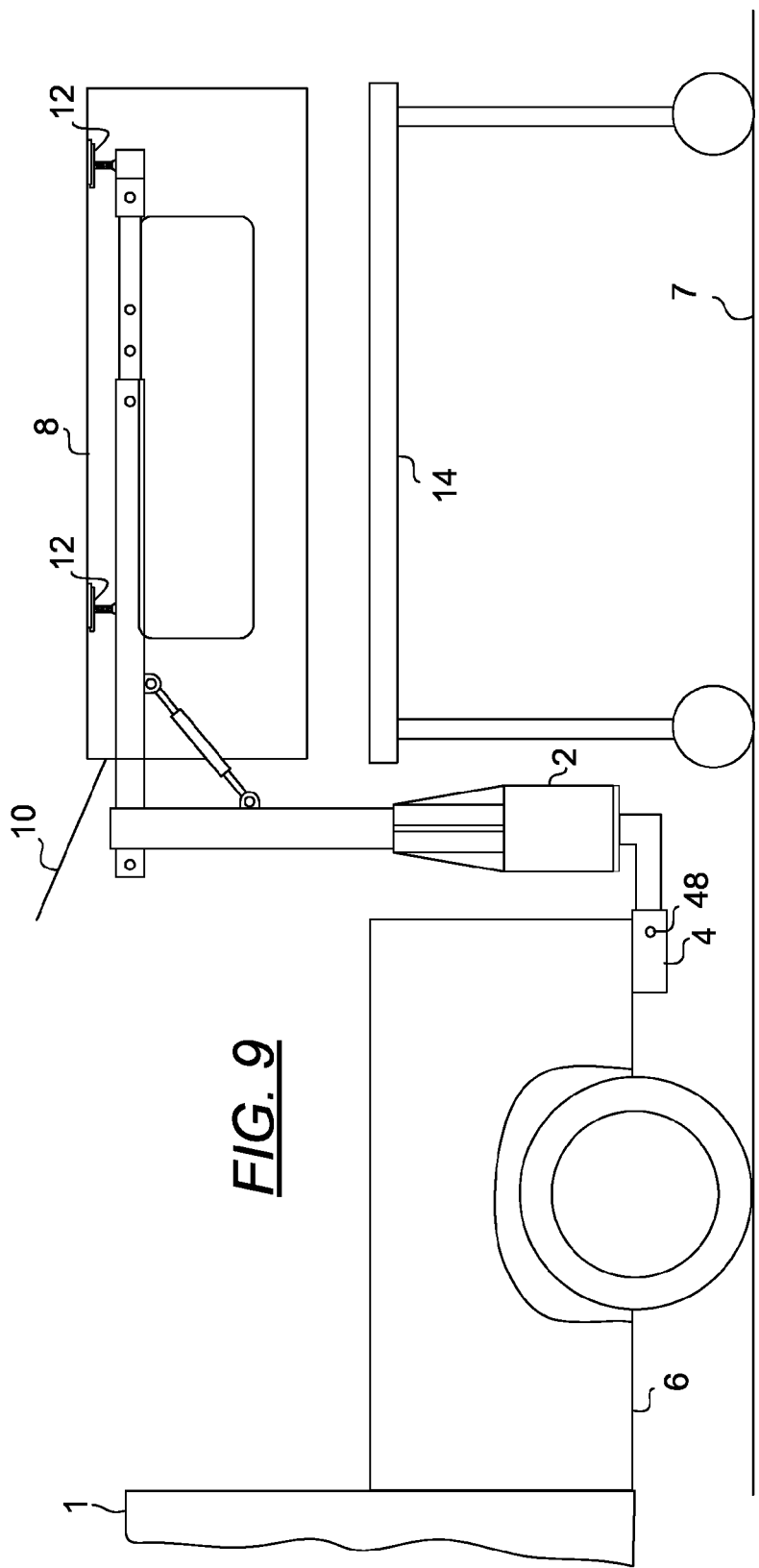
FIG. 9 is a side partially transparent orthogonal view of a truck bed depicting a truck cap remover and installer of FIG. 3 upon rotating the truck cap to a position in anticipation of being placed on a support.

FIG. 7 is a side partially transparent orthogonal view of a truck bed, depicting the apparatus 2 of FIG. 1 upon raising the truck cap 8. FIG. 8 is a side partially transparent orthogonal view of a truck bed, depicting the apparatus 2 of FIG. 7 upon sliding back the truck cap 8 that has been raised. FIG. 9 is a side partially transparent orthogonal view of a truck bed depicting the apparatus 2 of FIG. 3 upon rotating the truck cap 8 to a position in anticipation of being placed on a support 14. In use, the present invention may be attached to a hitch 4 as a unit or it may be installed in portions. The box member 18 may be installed first without the mast 20 to facilitate handling. The rear door 10 is disposed in the open position to provide access to the volume define by the truck cap 8. Upon installing the box member 18 by securing the hitch adaptor 16 to the hitch 4, the mast 20, with or without the boom already installed, may then be placed in the cavity 13 of the sleeve 21. The present apparatus 2 is positioned such that the bumpers 12 are positioned below the ceiling 23 and about the center of the truck cap 8 by adjusting the relative position of the first slideable member 34 with respect to the boom 24. The jack rod 44 (see FIGS. 5 and 6) is then manually raised such that the bumpers 12 contact and lift the truck cap 8 a distance of about 2 inches. The truck cap 8 is then slid rearward to provide sufficient clearance between the truck cab 1 and the front portion of the truck cap 8 for subsequent rotation of the truck cap 8. The truck cap 8 is then rotated approximately 180 degrees about the lengthwise axis of the mast 20 such that the front portion of the truck cap 8 now points toward the rear of the truck 3. The truck cap 8 is then pulled rearward to clear the vertical space of the truck bed 6. A support 14 is then positioned under the still suspended truck cap 8 before it is lowered by lowering the jack rod 44 (see FIGS. 5 and 6). As will be readily appreciated by those skilled in the art, the present apparatus 2 may also be used to facilitate the installation of a truck cap 8 by reversing the process of removing the truck cap 8.

It will be appreciated by those skilled in the art that while the invention has been described above in connection with particular embodiments, the invention is not necessarily so limited and that numerous other embodiments, uses, modifications and departures from the embodiments, and uses may be made without departing from the inventive concepts and may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

I claim:

1. An apparatus for removing a truck cap from a bed of a truck and installing the truck cap over the bed of the truck, said apparatus comprising:
a lifting means for raising the truck cap off the bed of the truck or lowering the truck cap onto the bed of the truck, wherein said lifting means comprises:
a box member having a hitch end, a mast end, an opening, a stop and a cavity for receiving an actuator, wherein said box member is configured to be adapted to a hitch at said hitch end and said opening of said box member is disposed at said mast end and said stop is disposed about the periphery of said opening of said box member;

a sleeve having a lower end, an upper end and a cavity, wherein said lower end of said sleeve is securely attached to said mast end of said box member such that said sleeve is coaxially aligned with said opening of said box member;

a mast having a lower end and an upper end, wherein said lower end of said mast comes in contacting engagement with said actuator such that when said actuator is extended through said opening of said box member, said mast is raised and when said actuator is retracted from said opening of said box member, said lower end of said mast rests on said stop and said mast is configured to be rotatable about the central axis of said sleeve and slideable along the lengthwise direction of said mast within said cavity of said sleeve;

a boom having a first end, a second end and a cavity, wherein said first end is fixedly connected to said upper end of said mast at a substantially right angle to said mast;

a first slideable member having a free end and a slideable end, said first slideable member is configured to be slideably attached at said slideable end within said cavity of said boom substantially along the lengthwise direction of said boom and securable to said boom; and an elongated spread arm disposed at a substantially right angle to and at said free end of said first slideable member and at least three upwardly facing bumpers, each disposed at each end of said elongated spread arm and on said boom such that said at least three upwardly facing bumpers are substantially coplanarly disposed, wherein said actuator is configured to raise or lower the truck cap by raising or lowering said at least three upwardly facing bumpers to support a ceiling of the truck cap;

a lateral shifting means for moving said truck cap in a plane substantially coplanar to the bed of the truck while the truck cap is supported on said apparatus; and a rotating means for rotating said truck cap about an axis substantially normal to the bed of the truck.

2. The apparatus of claim 1, wherein said lateral shifting means comprises:

a mast having an upper end and a lower end;

a boom having a first end, a second end and a cavity, wherein said first end is fixedly connected to said upper end of said mast at a substantially right angle to said mast;

a first slideable member having a free end and a slideable end, said first slideable member is configured to be slideably attached at said slideable end within said cavity of said boom substantially along the lengthwise direction of said boom and securable to said boom; and an elongated spread arm disposed at a substantially right angle to and at said free end of said first slideable member and at least three upwardly facing bumpers, each disposed at each end of said elongated spread arm and on said boom such that said at least three upwardly facing bumpers are substantially coplanarly disposed, wherein said at least three upwardly facing bumpers are configured to allow sliding movement of the truck cap with respect to said at least three upwardly facing bumpers.

3. The apparatus of claim 1, wherein said rotating means comprises:

a box member having a hitch end and a mast end;

a sleeve having a lower end, an upper end and a cavity, wherein said lower end of said sleeve is securely attached to said mast end of said box member;

a mast rotatable about the central axis of said sleeve within said cavity of said sleeve such that the truck cap is capable of being rotated while supported on said apparatus.

4. An apparatus for removing a truck cap from a truck and installing the truck cap to the truck, said apparatus comprising:

a box member having a hitch end, a mast end, an opening, a stop and a cavity for receiving an actuator, wherein said box member is configured to be adapted to a hitch at said hitch end and said opening of said box member is disposed at said mast end and said stop is disposed about the periphery of said opening of said box member;

a sleeve having a lower end, an upper end and a cavity, wherein said lower end is securely attached to said mast end of said box member such that said sleeve is coaxially aligned with said opening of said box member;

a mast having a lower end and an upper end, wherein said lower end of said mast comes in contacting engagement with said actuator such that when said actuator is extended through said opening of said box member, said mast is raised and when said actuator is retracted from said opening of said box member, said lower end of said mast rests on said stop and said mast is configured to be rotatable about the central axis of said sleeve and slideable along the lengthwise direction of said mast within said cavity of said sleeve;

a boom having a first end, a second end and a cavity, wherein said first end is fixedly connected to said upper end of said mast at a substantially right angle to said mast;

a first slideable member having a free end and a slideable end, said first slideable member is configured to be slideably attached at said slideable end within said cavity of said boom substantially along the lengthwise direction of said boom and securable to said boom; and a means for supporting a ceiling of said truck cap, wherein said means is cooperatively supported by said first slideable member and said boom.

5. The apparatus of claim 4, wherein said actuator comprises a jack having a head and a rod, wherein said jack is disposed in said cavity of said box member such that said rod is capable of extending through said opening of said box member.

6. The apparatus of claim 4, wherein said means for supporting said ceiling of said truck cap comprises an elongated spread arm disposed at substantially right angle to and at said free end of said first slideable member and at least three upwardly facing bumpers, each disposed at each end of said elongated spread arm and on said boom such that said at least three upwardly facing bumpers are substantially coplanarly disposed.

7. The apparatus of claim 6, wherein each said at least three upwardly facing bumpers is adapted to a second slideable member configured to slide substantially parallelly to said boom.

8. The apparatus of claim 6, wherein each said at least three upwardly facing bumpers is adapted to a screw-nut type height adjuster such that the height of each bumper can be fine tuned.

9. The apparatus of claim 4, further comprising a support disposed independently from the truck, said support is configured for receiving and supporting the truck cap.

10. The apparatus of claim 4, wherein said hitch is configured to be attached to the truck.

11. The apparatus of claim 4, wherein said angle is adjustable.

12. The apparatus of claim 4, wherein said angle is adjustable using a turnbuckle having a first end and a second end, said first end of said turnbuckle is pivotably connected to said boom and said second end of said turnbuckle is pivotably connected to said mast.

13. The apparatus of claim 4, wherein said at least three upwardly facing bumpers are constructed from a material selected from the group consisting of Teflon and nylon.

14. An apparatus for removing a truck cap from a truck and installing the truck cap to the truck, said apparatus comprising:
- a box member having a hitch end, a mast end, an opening, a stop and a cavity for receiving an actuator, wherein said box member is configured to be adapted to a hitch at said hitch end and said opening of said box member is disposed at said mast end and said stop is disposed about the periphery of said opening of said box member;
- a sleeve having a lower end, an upper end and a cavity, wherein said lower end of said sleeve is securely attached to said mast end of said box member such that said sleeve is coaxially aligned with said opening of said box member;
- a mast having a lower end and an upper end, wherein said lower end of said mast comes in contacting engagement with said actuator such that when said actuator is extended through said opening of said box member, said mast is raised and when said actuator is retracted from said opening of said box member, said lower end of said mast rests on said stop and said mast is rotatable about the central axis of said sleeve and slideable along the lengthwise direction of said mast within said cavity of said sleeve;
- a boom having a first end, a second end and a cavity, wherein said first end is fixedly connected to said upper end of said mast at a substantially right angle to said mast;
- a first slideable member having a free end and a slideable end, said first slideable member is configured to be slideably attached at said slideable end within said cavity of said boom substantially along the lengthwise direction of said boom and securable to said boom; and
- an elongated spread arm disposed at a substantially right angle to and at said free end of said first slideable member and at least three upwardly facing bumpers, each disposed at each end of said elongated spread arm and on said boom such that said at least three upwardly facing bumpers are substantially coplanarly disposed, wherein said actuator is configured to raise or lower the truck cap by raising or lowering said at least three upwardly facing bumpers to support a ceiling of the truck cap, said at least three upwardly facing bumpers are configured to allow sliding movement of the truck cap with respect to said at least three upwardly facing bumpers and said mast is configured to rotate within said sleeve such that the truck cap is capable of being rotated while supported on said bumpers.

15. The apparatus of claim 14, wherein said actuator comprises a jack having a head and a rod, wherein said jack is disposed in said cavity of said box member such that said rod is capable of extending through said opening of said box member.

16. The apparatus of claim 14, wherein each said at least three upwardly facing bumpers is adapted to a second slideable member configured to slide substantially parallelly to said boom.

17. The apparatus of claim 14, wherein each said at least three upwardly facing bumpers is adapted to a screw-nut type height adjuster such that the height of each bumper can be fine tuned.

18. The apparatus of claim 14, wherein said hitch is configured to be attached to the truck.

19. The apparatus of claim 14, wherein said angle is adjustable using a turnbuckle having a first end and a second end, said first end of said turnbuckle is pivotably connected to said boom and said second end of said turnbuckle is pivotably connected to said mast.

* * * * *